United States Patent Office 3,320,276
Patented May 16, 1967

3,320,276
PROCESS FOR THE HALOGENATION OF PHTHALOCYANINES
Alexander Hamilton and John Dewar Stewart, Glasgow, Scotland, assignors to J. R. Geigy A.G., Basel, Switzerland
No Drawing. Filed Feb. 1, 1966, Ser. No. 523,958
Claims priority, application Great Britain, Jan. 5, 1962, 453/62
10 Claims. (Cl. 260—314.5)

This application is a continuation-in-part of our pending patent application Ser. No. 247,528 filed Dec. 27, 1962, now abandoned.

This invention relates to a process for halogenating phthalocyanines.

It is known that by introducing halogen atoms into the phthalocyanine molecule, the color can be modified in the direction of making the dyestuff yellower. It is well known that the maximum number of halogen atoms which may be taken up by the phthalocyanine molecule is sixteen and that it is desirable to introduce as many as possible in order to produce the most desirable green shades.

Many processes have been proposed for carrying out the halogenation of phthalocyanine, whether metal-free or in the form of metal complexes, especially copper phthalocyanine. In these processes it has been proposed to use free halogen as the halogenating agent. It has also been proposed to use halogen carriers and for this purpose aluminum chloride or aluminum bromide has been used. Anhydrous aluminum chloride in the molten form has also been used as a vehicle in which to carry out the halogenation and in this connection compounds such as alkali metal halides have been used as fluxes to lower the melting point. There has also been proposed a process which comprises treating a phthalocyanine or mixture of phthalocyanines with elemental chlorine or bromine or a mixture thereof in a fluid melt containing anhydrous aluminum chloride and an oxide, bromide, chloride, oxybromide, or oxychloride of sulfur or any mixture of two or more such sulfur compounds at a temperature of about 60°–200° C. Furthermore, compounds of sulfur which will effect halogenation, such as thionyl chloride and sulfuryl chloride, are mentioned in the prior art, as diluents and halogenating agents, using aluminum chloride as a catalyst, but their applications normally demanded high temperatures and pressures.

In these known processes which employ sulfur-containing chlorinating agents, it is often difficult to avoid the presence of small amounts of combined sulfur in the final chlorinated phthalocyanine pigments. Even a small content of such sulfur has, however, the serious disadvantage of imparting to the pigment a dull, greyish hue, while brilliant pure green shades are required of a useful pigment of this type.

The exact manner in which the above-mentioned sulfur is bound to the phthalocyanine molecule and the way in which it dulls the shade are not known.

Surprisingly we have now found that sulfuryl chloride will halogenate a metal-free phthalocyanine or a metal complex of phthalocyanine such as copper phthalocyanine without the addition of elemental halogen and without recourse to superatmospheric pressures and excessively high temperatures, provided that the reaction is carried out in a fluid melt of aluminum chloride and/or aluminum bromide, preferably containing an alkali metal halide, such as sodium chloride and that sulfur monochloride is present as halogen carrier.

According to the present invention, therefore, a process for halogenating and, especially, for chlorinating or mixed chlorinating and brominating, phthalocyanines comprises reacting a metal-free phthalocyanine or a complex-metal phthalocyanine with a critical combination of sulfuryl chloride, in a melt composed essentially of a Friedel-Crafts catalyst, and of sulfur monochloride, especially in the amounts given further below.

By the process of this invention, a halogenated phthalocyanine which may be, for example, a chloro- or chlorobromo-phthalocyanine unmetallized or in the form of a copper complex and containing at least 13 halogen atoms in the molecule may be obtained at temperatures as low as 130° C. At slightly higher temperatures, e.g. at 140° to 160° C. it is possible to attain contents of about 14 to 15 halogen atoms. The halogenated phthalocyanines thus obtained are of brilliant green shade and particularly free from combined sulfur in any shade-deteriorating amounts. This is especially surprising since the use of significant amounts of sulfur monochloride would have been expected to lead unavoidably to noticeable sulfur contents in the end products, in view of the well known tendency of sulfur monochloride to disproportionate according to the equation $$S_2Cl_2 \rightarrow SCl_2 + S$$

[Kirk-Othmer, Encyclopedia of Chemical Technology, 13, 402 (1954)].

It is one advantage of the invention that free halogen is not required in this process; sulfur monochloride, however, is required to assist the halogenation. Sulfur monochloride alone does not bring about a satisfactory halogenation of the phthalocyanine molecule, as shown by the products obtained thereby which have little or no commercial utility. Moreover, a decidedly inferior product containing combined sulfur results when sulfuryl chloride is employed as the halogenating agent in the absence of sulfur monochloride, other conditions remaining the same.

It is also surprising that use of sulfur dichloride in lieu of sulfur monochloride, in combination with sulfuryl chloride, in the process according to the invention leads to green products contaminated with combined sulfur and hence of dulled aspect and slight greyish hue, although the opposite would be expected on account of the above-mentioned disproportionation equation.

The quantities of sulfuryl chloride and of sulfur monochloride used are important for a satisfactory performance of the process according to the invention. For 10 parts by weight of phthalocyanine (metallic or metal-free) the preferred range of sulfuryl chloride used is from 55 parts to 80 parts by weight whilst the preferred quantities of sulfur monochloride employed therewith range from 6 parts to 20 parts, and preferably 6 to 10 parts by weight.

For the attainment of halogenation with 13 halogen atoms, the above given minimum proportions of sulfuryl chloride and sulfur monochloride are critical. With lesser amounts of sulfuryl chloride e.g. 45 parts per 10 parts of copper phthalocyanine, it is still possible to introduce the minimum of 13 halogen atoms but in this way sulfur is introduced causing undesirable dulling of the green shade of the pigment.

The upper limit proportion given for sulfuryl chloride is a practical one, higher amounts being superfluous. The maximum proportion of sulfur monochloride given is, however, critical, since with larger amounts the end products would be contaminated with combined sulfur.

It is possible to vary the temperature at which halogenation may be effected within relatively wide limits without departing from the scope of this invention, but a preferred working range of temperature is between the approximate limits of 130° to 200° C.

By means of this invention, it is possible to increase the ratio of bromine to chlorine in chloro-bromo phthalocyanines simply by increasing the amount of inorganic bromide present in the melt, or by decreasing the amount of sulfur monochloride used, but not below the above given minimum weight ratio of sulfur monochloride to phthalocyanine of 6:10.

Among suitable Friedel-Crafts catalysts are aluminum chloride, aluminum bromide, ferric chloride, zinc chloride or antimony trichloride. The melt may contain an inorganic salt especially an alkali metal halide such as sodium chloride.

If aluminum bromide and/or an alkali metal bromide or ammonium bromide or a bromide of a metal classified in Group II of the Periodic Table is present in the melt, then some bromine is introduced into the phthalocyanine molecule. The resulting product is yellower than if the halogen introduced is solely chlorine.

It is also found to be the case that for a given weight of the inorganic bromide selected, bromination proceeds more readily at lower temperatures than does chlorination, although the total halogenation achieved may be rather less than at higher temperatures.

Mixed bromination/chlorination of phthalocyanines with 13 halogen atoms can already be achieved in as short a time as 20 minutes at as low a temperature as 100° C.; however, such products are preponderantly brominated, and therefore, of yellow/green shade. For the obtainment of the more emerald shades, it is necessary to introduce the 13 halogen atoms preponderantly as chlorine atoms, and this is achieved by heating to the abovementioned preferred temperatures of 160° C. for at least about 120 minutes.

Introduction of the desired amount of halogen can be controlled by analyzing samples from the melt. Once the attainable degree of halogenation has been reached which is dependent on the proportions of the critical agents, especially sulfuryl chloride and sulfur monochloride, as described above, prolongation of the treatment will not increase the halogen content further, and hence be uneconomical.

By obviating the use of either chlorine or bromine in an elemental form, the process is rendered less hazardous and more readily controllable. Furthermore, risk of corrosion is minimized when conducting the reaction on an industrial scale.

A further advantage of this present process is that the product obtained when the halogenation melt is drowned out into water or dilute acid is in good pigmentary form and does not need any extensive subsequent processing such as acid pasting which has been commonly used in the past.

The invention will be illustrated by, but is not limited to, the following examples, in which all parts and percentages are by weight unless expressly stated otherwise. The reactions are carried out in a vessel equipped with thermometer, agitator and reflux condenser.

*Example 1*

(A) 100 parts of anhydrous aluminum chloride, 10 parts of sodium chloride, 10 parts of copper phthalocyanine (CuPc), 10 parts of sulfur monochloride and 66.6 parts of sulfuryl chloride are mixed together in a reaction vessel. The internal temperature is raised to 160° C. and held at this temperature for 4 hours, after which the melt is run into a stirred mixture of 300 parts of water and 700 parts of ice, adding extra ice as necessary to maintain the temperature below 5° C. The pH of the slurry is adjusted to 1.5 to 2.0 with hydrochloric acid. The product obtained after filtering, washing and drying is a bright green pigment containing 48.1% of chlorine and is free from combined sulfur. This corresponds to about 14.5 chlorine atoms per CuPc molecule.

(B) If the above reaction is repeated, save that no sulfur monochloride is included, there is ultimately obtained a blue-green pigment containing 44.1% of chlorine or only about 12.6 chlorine atoms per CuPc molecule, which, due to the presence of 2.4% of combined sulfur, is much inferior in shade to that prepared in accordance with Example 1(A).

This experiment demonstrates the significance of using sulfur monochloride conjointly with sulfuryl chloride in the process of the present invention.

If the above example is repeated, but, in lieu of 10 parts of sulfur monochloride, the equivalent amount of sulfur dichloride is used, a pigment of approximately equal chlorine content, but with a content of about 0.25% of combined sulfur is obtained which has a dull appearance and the green shade of which shows a distinct olive-grey hue.

(C) When repeating the procedure under (A), supra, but using 55 parts instead of 66.6 parts of sulfuryl chloride, a bright green pigment of similar composition is obtained, which is also free from detectable amounts of combined sulfur. However, when only 50 parts of sulfuryl chloride are used, a pigment of dull green shade is obtained which contains 1.2% of combined sulfur.

(D) When repeating the procedure under (A), supra, but using 6 parts of sulfur monochloride in lieu of 10 parts, a brilliant green pigment free from combined sulfur is obtained. On the other hand, if only four parts of sulfur monochloride are used in the procedure under (A) a distinctly dulled green pigment is obtained which contains 0.6% of combined sulfur, or more.

(E) When, in the procedure under (A) 20 parts of sulfur monochloride are used instead of 10 parts, a bright green pigment, free from any detectable amount of combined sulfur is obtained., (F) When, in the procedure under (A), 23.3 parts of sulfur monochloride are used instead of 10 parts, a pigment of dull green shade is obtained which contains 0.6% of combined sulfur.

*Example 2*

100 parts of anhydrous aluminum chloride and 10 parts of sodium chloride are introduced into a reaction vessel and a mixture consisting of 10 parts of sulfur monochloride and 66.6 parts of sulfuryl chloride is thereupon added. On heating to 50° C. a fluid melt is obtained and 10 parts of copper phthalocyanine are then added. The mixture is heated to 160° C. at which temperature it is held for 4 hours, when the melt is run with agitation into 1000 parts of aqueous 5% nitric acid. On separating the product by filtration, followed by washing and drying, there is obtained a bright green pigment containing 49.0% of chlorine free from any detectable combined sulfur, which does not require after-treatment by acid-pasting.

The above chlorine content of the final product corresponds to 15 chlorine atoms per CuPc molecule.

*Example 3*

100 parts of anhydrous aluminum chloride, 10 parts of sodium chloride, 66.6 parts sulfuryl chloride, 13.4 parts of sulfur monochloride and 10 parts of mono-chloro cobalt phthalocyanine are introduced into a reaction vessel. The mix is heated to 160° C. and held at this temperature for 4 hours, after which the coloring matter is precipitated and isolated as described in Example 1(A) to yield a blue-green pigment containing 45.0% of chlorine, which corresponds to a total of 12.98 atoms of chlorine per molecule of the resulting chlorinated cobalt phthalocyanine.

*Example 4*

100 parts of anhydrous aluminum chloride, 10 parts of sodium chloride, 66.6 parts of sulfuryl chloride, 13.4 parts of sulfur monochloride and 10 parts of mono-chloro copper phthalocyanine are introduced into a reaction vessel. After heating the mixture to 160° C. and maintaining the fluid melt at this temperature for 4 hours, the melt is run with agitation into 2000 parts of aqueous 5% nitric acid. On separating the product as described in Example 2, a bright green coloring matter is isolated, containing 48.2% of chlorine, and corresponding to 14.6 atoms of chlorine per molecule of pigment.

*Example 5*

58.5 parts of anhydrous aluminum chloride, 41.7 parts of potassium bromide, 10 parts of copper phthalocyanine, 10 parts of sulfur monochloride and 66.6 parts of sulfuryl chloride are mixed together in a reaction vessel. The mixture is then raised to a temperature of 160° C. and maintained at 160° for 4 hours. The product is then isolated as described in Example 1(A) and there is obtained a bright yellow-green pigment containing 28.6% of bromine and 25.7% of chlorine, which corresponds to a total of 13.3 halogen atoms per molecule of pigment, of which 8.9 are chlorine and 4.4 bromine atoms.

*Example 6*

100 parts of anhydrous aluminum chloride, 36 parts of sodium bromide, 66.6 parts of sulfuryl chloride, 10 parts of sulfur monochloride and 10 parts of copper phthalocyanine are heated in admixture to 160° C. After keeping the temperature at 160° C. for 4 hours, the fluid melt is treated in accordance with the procedure described in Example 1(A) to obtain a bright yellow-green pigment containing 34.3% of bromine and 21.6% of chlorine, which corresponds to a total of 13.2 halogen atoms per molecule of pigment, namely 7.7 chlorine atoms and 5.5 bromine atoms.

*Example 7*

By substituting 35 parts of calcium bromide for the 36 parts of sodium bromide therein used and proceeding in accordance with the details of Example 6, a green pigment results, containing 30.6% of bromine and 24.2% of chlorine, i.e. a total of 13.3 halogen atoms (8.5 Cl and 4.8 Br) per molecule of pigment.

*Example 8*

100 parts of anhydrous aluminum chloride, 41.7 parts of potassium bromide, 66.6 parts of sulfuryl chloride, 10 parts of sulfur monochloride and 10 parts of mono-chlorinated copper phthalocyanine are heated in admixture to 160° C. After holding the temperature of the melt at 160° C. for 45 minutes, the product is isolated in accordance with the method described in Example 1(A). The resulting green pigment contains 33.0% of bromine and 24.2% of chlorine, i.e. 14.4 halogen atoms (9.0 Cl and 5.4 Br) per molecule of resulting pigment.

*Example 9*

100 parts anhydrous aluminum chloride, 66.6 parts potassium bromide, 66.6 parts sulfuryl chloride, 10 parts sulfur monochloride and 10 parts copper phthalocyanine are heated in a reaction vessel to 140° C. On agitating the melt at 140° C. for 20 minutes running into aqueous 5% nitric acid and subsequently isolating, washing and drying the product, a bright yellow-green pigment is obtained with a bromine content of 41.9% and a chlorine content of 17.2%, i.e. a total of 13.9 halogen atoms (6.7 Cl and 7.2 Br) per molecule of final pigment.

This example demonstrates that an increase in the content of inorganic bromide, coupled with a lower temperature and a shorter reaction time, furnishes a product with enhanced bromine content.

We claim:

1. A process for producing green metal phthalocyanines having at least about 13 chlorine atoms per molecule, comprising
   reacting at a temperature of about 130° to 200° C. a complex metal phthalocyanine in a melt consisting essentially of a Friedel-Crafts chlorination catalyst with, per 10 parts by weight of said phthalocyanine, from about 55 to 80 parts by weight of sulfuryl chloride and from about 6 to 20 parts by weight of sulfur monochloride,
   thereby obtaining a green metal phthalocyanine of the aforesaid chlorine content free from dulling by combined sulfur.

2. A process as described in claim 1, in which the Friedel-Crafts catalyst is aluminum chloride.

3. A process as described in claim 1, in which the temperature of the reaction is from 140° to 160° C.

4. A process for halogenating phthalocyanine consisting essentially of reacting at a temperature of 100 to 200° C., a complex metal phthalocyanine in a melt consisting essentially of a Friedel-Crafts catalyst and in the presence, in the melt, of, per 10 parts by weight of said phthalocyanine, from about 55 to 80 parts by weight of sulfuryl chloride, from about 6 to 20 parts by weight of sulfur monochloride and a halide member selected from the group consisting of an alkali metal halide, ammonium bromide and a bromide of a metal of Group II of the Periodic Table of Mendeljeff, thereby obtaining a green pigment having at least 13 halogen atoms per molecule of final phthalocyanine and being free from dulling amounts of sulfur.

5. A process as described in claim 4, in which the alkali metal halide is sodium chloride.

6. A process as described in claim 4, in which the alkali metal halide is an alkali metal bromide.

7. A process as described in claim 4, in which the Friedel-Crafts catalyst contains aluminum bromide.

8. A process as described in claim 4, wherein the Friedel-Crafts catalyst consists essentially of a mixture of aluminum chloride and aluminum bromide.

9. A process as described in claim 4, wherein said halide member is a bromide, and wherein said reaction is carried out at a temperature of at least 160° C.

10. A process as described in claim 4, wherein said halide member is an alkali metal halide.

References Cited by the Examiner

UNITED STATES PATENTS 2,873,279   2/1959   Randall et al. _____ 260—314.5
3,012,035   12/1961  Knowles et al. _____ 260—256.4

OTHER REFERENCES

Groggins Unit Processes in Organic Synthesis, McGraw-Hill, New York, 5th Ed. (1958), pp. 253 to 255.

WALTER A. MODANCE, *Primary Examiner.*

JAMES A. PATTEN, *Assistant Examiner.*